United States Patent
Simpson et al.

(10) Patent No.: US 9,624,112 B2
(45) Date of Patent: Apr. 18, 2017

(54) DESALINATION SYSTEM USING A FILTER PRESS

(71) Applicant: Daniel J. Simpson, Rio Vista, CA (US)

(72) Inventors: Daniel J. Simpson, Rio Vista, CA (US); Ferdinand Kogler, Rio Vista, CA (US)

(73) Assignee: Daniel J. Simpson, Rio Vista, CA (US)

( * ) Notice: Subject to any disclaimer, the term of this patent is extended or adjusted under 35 U.S.C. 154(b) by 542 days.

(21) Appl. No.: 14/077,744

(22) Filed: Nov. 12, 2013

(65) Prior Publication Data
US 2014/0166466 A1    Jun. 19, 2014

Related U.S. Application Data

(62) Division of application No. 12/697,974, filed on Feb. 1, 2010, now Pat. No. 8,580,084.

(51) Int. Cl.
*C02F 1/04* (2006.01)
*B01D 1/00* (2006.01)
(Continued)

(52) U.S. Cl.
CPC .............. *C02F 1/04* (2013.01); *B01D 1/0017* (2013.01); *B01D 5/006* (2013.01); *B01D 5/0072* (2013.01);
(Continued)

(58) Field of Classification Search
CPC ........ C02F 1/04; C02F 11/122; C02F 11/123; C02F 103/08; B01D 1/0017; B01D 5/006;
(Continued)

(56) References Cited

U.S. PATENT DOCUMENTS 3,048,928 A    8/1962 Copson et al.
4,087,357 A    5/1978 Barrett et al.
(Continued)

OTHER PUBLICATIONS

Radio Frequency Co. "Macrowave RF Filter Press Cake Drying System." Obtained from the Internet Archive Wayback Machine at <http://web.archive.org/web/20080503190523/http://www.radiofrequency.com/products/filterpress.html>. Archived May 2008, obtained by the examiner on Apr. 27, 2016.*
(Continued)

*Primary Examiner* — Christopher A Hixson
(74) *Attorney, Agent, or Firm* — David H. Jaffer; Pillsbury Winthrop Shaw Pittman LLP

(57) ABSTRACT

A filter press system for water desalination may comprise: a frame; a plurality of filter plates configured to form a stack of parallel plates, each of filter plates being movably attached to the frame, the filter plates further being configured to form a multiplicity of chambers, each of the chambers being formed by adjacent filter plates, each of the chambers being lined by filter cloths and substantially filled with beads, wherein the plurality of filter plates, the multiplicity of chambers and the filter cloths are configured to allow water vapor to escape from the chambers while retaining salts from the water to form a filter cake; a heater, for heating the water in the chambers; a condenser for condensing the water vapor; and a separator for separating the beads from the filter cake after the filter cake is released from the chambers.

25 Claims, 11 Drawing Sheets

(51) Int. Cl.
*B01D 5/00* (2006.01)
*C02F 11/12* (2006.01)
*C02F 103/08* (2006.01)

(52) U.S. Cl.
CPC ......... *C02F 11/122* (2013.01); *C02F 2103/08* (2013.01)

(58) Field of Classification Search
CPC .. B01D 5/0072; B01D 25/282; B01D 25/284; B01D 29/80; B01D 29/84; B01D 33/62; B01D 33/03; B01D 33/61; B07B 1/40; B07B 2230/04
See application file for complete search history.

(56) References Cited

U.S. PATENT DOCUMENTS

| | | |
|---|---|---|
| 4,108,777 A | 8/1978 | Kurita et al. |
| 4,263,011 A * | 4/1981 | Huguenard .......... B01D 9/0013 23/300 |
| 4,356,015 A | 10/1982 | Oliver |
| 4,482,459 A | 11/1984 | Shiver |
| 4,544,490 A | 10/1985 | Erickson et al. |
| 4,617,863 A | 10/1986 | Kenyon |
| 4,740,413 A | 4/1988 | Wildner |
| 4,839,045 A | 6/1989 | Wildner |
| 4,995,972 A | 2/1991 | Kramer et al. |
| 5,087,375 A | 2/1992 | Weinwurm |
| 5,398,816 A * | 3/1995 | Senapati ............ B01D 33/0376 209/364 |
| 5,643,444 A | 7/1997 | Garrigues et al. |
| 5,672,272 A | 9/1997 | Baer |
| 6,149,806 A | 11/2000 | Baer |
| 6,180,002 B1 | 1/2001 | Higgins |
| 6,280,638 B1 | 8/2001 | Belchev |
| D452,295 S | 12/2001 | Ricketts |
| 7,309,408 B2 | 12/2007 | Benavides |
| 7,422,680 B2 | 9/2008 | Sheets, Sr. |
| 7,713,427 B2 | 5/2010 | Perry et al. |
| 7,985,343 B2 | 7/2011 | Haldopoulos et al. |
| 7,998,354 B2 | 8/2011 | Duby |
| 8,535,542 B2 | 9/2013 | Simpson |
| 2001/0021428 A1 | 9/2001 | Simpson et al. |
| 2003/0083532 A1 | 5/2003 | Malhis |
| 2003/0132095 A1 | 7/2003 | Kenet et al. |
| 2004/0045682 A1* | 3/2004 | Liprie ................. B01D 1/0017 159/31 |
| 2004/0084380 A1 | 5/2004 | Kicinski |
| 2004/0149649 A1 | 8/2004 | Uchiyama |
| 2006/0032805 A1 | 2/2006 | Hildebrant et al. |
| 2006/0131224 A1 | 6/2006 | Hibble |
| 2007/0084781 A1 | 4/2007 | Hornback et al. |
| 2007/0125693 A1 | 6/2007 | Lindley |
| 2008/0082093 A1 | 4/2008 | Prakash et al. |
| 2008/0190831 A1 | 8/2008 | Marchek |
| 2008/0210467 A1 | 9/2008 | Eia |
| 2010/0116755 A1 | 5/2010 | Simpson et al. |

OTHER PUBLICATIONS

International Search Report and Written Opinion issued Mar. 23, 2011 for PCT/US2011/23310.

* cited by examiner

Process Flow for Desalination of Water in a Filter Press

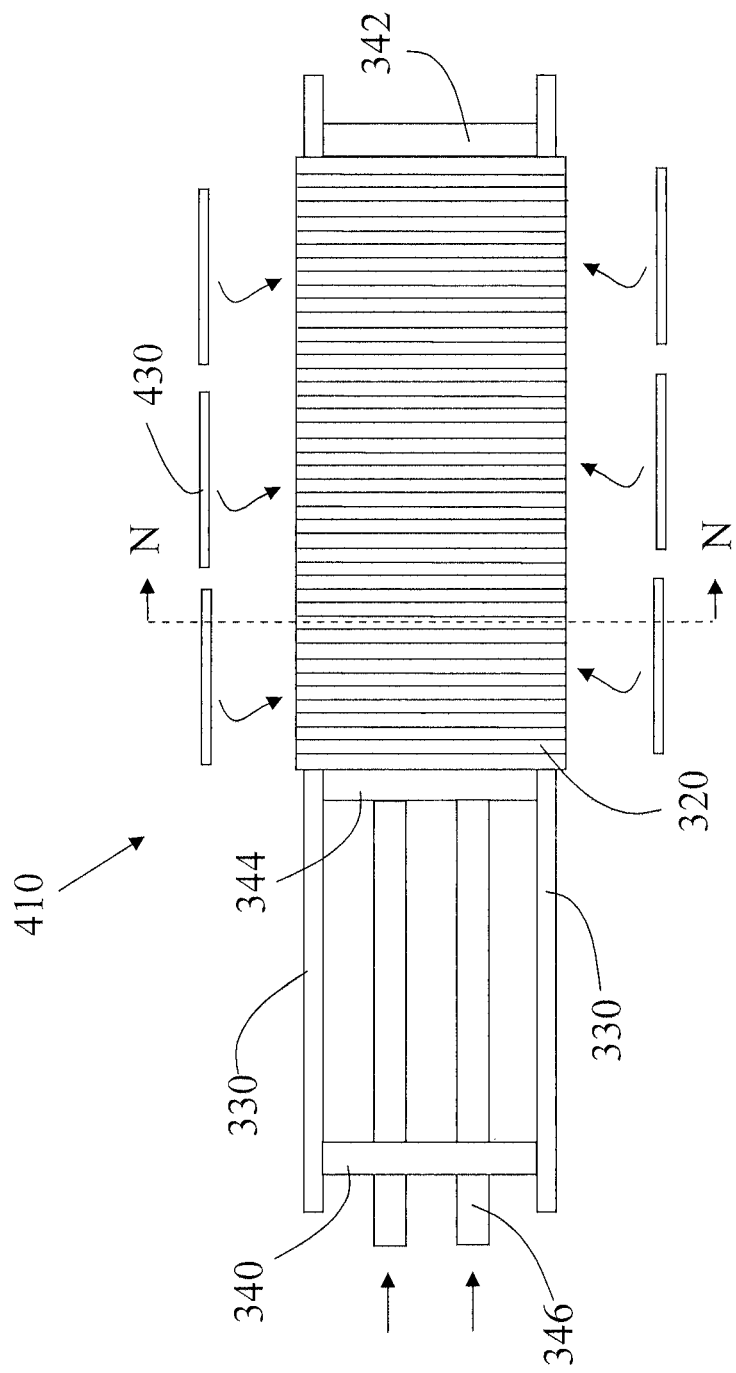

SECTION N-N

SECTION Y-Y

SECTION Z-Z

DESALINATION SYSTEM USING A FILTER PRESS

RELATED APPLICATIONS

This application is a divisional of U.S. patent application Ser. No. 12/697,974 filed Feb. 1, 2010, incorporated by reference in its entirety herein.

FIELD OF THE INVENTION

The invention relates to a system for water desalination and more specifically to a system for water desalination including a filter-press.

BACKGROUND OF THE INVENTION

Water desalination refers to processes that remove salts and other minerals from water. The processes are most often used for desalination of sea water and brackish water. Modernly, the most common desalination processes are reverse osmosis and vacuum distillation. However, these processes often require preprocessing of water to remove contaminants prior to desalination.

Desalination processes may be used for the production of pure water, and/or for extraction of salts from salt bearing water. For example, desalination processes may be used to provide potable water and/or dry sea salt from sea water.

SUMMARY OF THE INVENTION

This invention is a system and method for desalination of water, such as sea water and brine, using a filter press. Chambers in the filter press are loaded with large numbers of beads and the sea water/brine. The beads fill the chambers, defining the shape and size of the chambers. When the water in the chambers is heated, the beads provide surfaces on which salts readily deposit and water vapor is produced. Desalinated water is collected by condensing water vapor generated in the chambers—the condensed water vapor is generally referred to as condensate. The salts that precipitate in the chamber on and around the beads are generally referred to as filter cake. The heating of the sea water/brine may be radio frequency heating.

Radio frequency heating provides a potentially very efficient method of directly heating the sea water/brine within the filter press. This may be achieved by choosing a radio frequency for which the sea water/brine has strong absorption of the radio frequency energy and fabricating the filter press out of materials with weak radio frequency absorption at the chosen frequency. Direct heating of the sea water/brine also has the advantage of removing the need for indirect heating. For example, for desalination, there are frequencies for which sea water/brine is strongly absorbing and for which plastics materials/polymers, out of which filter plates may be made, are weakly absorbing.

According to aspects of the invention, a method of water desalination in a filter press comprises: providing a plurality of beads in a chamber between two filter plates in the filter press, the chamber being lined by filter cloths; pumping water into the chamber; heating the water in the chamber; and collecting water vapor generated by the heating. Further, during the heating, the chamber may be vacuum pumped to facilitate removal of water vapor. Furthermore, the heating may be radio frequency heating. On completion of a desalination process, the contents of the chambers—beads and precipitated salts—may be released from the filter press; further, the beads may be separated from the precipitated salts and then the beads may be reused in the chambers of the filter press.

According to further aspects of the invention, a filter press system for water desalination comprises: a frame; a plurality of filter plates configured to form a stack of parallel plates, each of the plurality of filter plates being movably attached to the frame, the plurality of filter plates further being configured to form a multiplicity of chambers, each of the multiplicity of chambers being formed by adjacent filter plates of the plurality of filter plates, each of the multiplicity of chambers being lined by filter cloths, wherein the plurality of filter plates, the multiplicity of chambers and the filter cloths are configured to allow water vapor to escape from the chambers while retaining salts from the water to form a filter cake; a heater, for heating the water in the multiplicity of chambers; a condenser for condensing the water vapor; and a separator for separating the beads from the filter cake after the filter cake is released from the chambers. Furthermore, the heater may be a radio frequency heater, which may comprise parallel electrode plates attached to the frame and electrically coupled to a radio frequency generator, the parallel electrode plates being configured with the planes of the parallel electrode plates roughly orthogonally to the planes of each of the plurality of filter plates, and in close proximity to the outer surface and on either side of the plurality of filter plates. The filter press system may further comprise a vacuum pump connected to the multiplicity of chambers. The separator may be a vibrating screen separator.

Although the present invention has been described with reference to water desalination, the teaching and principles of the present invention are applicable to a wide variety of fluid purification processes. For example, the teaching of the present invention is applicable to purification of salt water contaminated oil—for removal of both water and salts—and also to purification of biodiesel fuels.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 6A shows a top view of a filter press with integrated radio frequency heating using parallel plate electrodes, according to some embodiments of the present invention;

DETAILED DESCRIPTION

Figure 1:
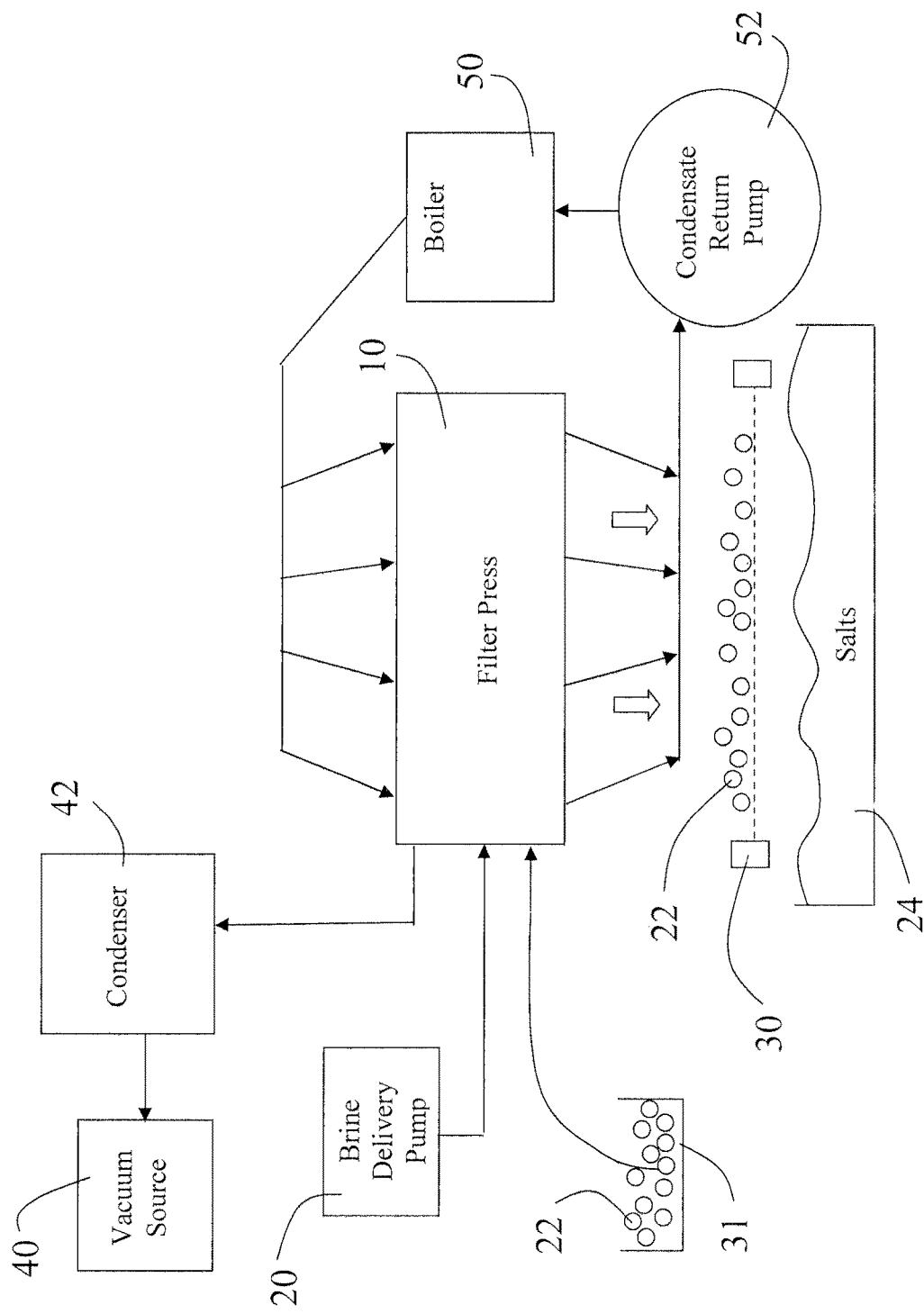
FIG. 1 is a schematic of a filter press system for water desalination, according to some embodiments of the present invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

This invention is a system and method for desalination of water, such as sea water, brine and brackish water, using a filter press. Chambers in the filter press are loaded with large numbers of beads and the sea water/brine. When the water in the chambers is heated, the beads provide surfaces on which salts readily deposit and water vapor is produced. Desalinated water is collected by condensing the water vapor—the condensed water vapor is generally referred to as condensate. The salts that precipitate in the chamber on and around the beads are generally referred to as filter cake.

The beads may be made of plastics/polymers, glass or metals. The beads may have smooth spherical surfaces. The beads should be large enough to be easily separated from the salts deposited in the chambers of the filter press—this allows the beads to be reused; for example, the beads may be approximately 3 millimeters in diameter.

In some embodiments of the present invention, the heating of the water in the chambers of the filter press is done by radio frequency heating. Radio frequency heating, also referred to as dielectric heating, occurs due to dielectric losses in a material exposed to a changing electric field. An apparatus for dielectric heating at lower frequencies may include parallel metal plates with a changing potential difference applied at a frequency somewhere in the range of 1 to 100 megahertz; particular frequencies that have been set aside by the United States FCC for dielectric heating are 13.56, 27.12 and 40.68 MHz. Material is placed or moved between the parallel plates in order to be heated. Microwave heating of materials is a sub-category of dielectric heating within a frequency range of approximately 300 to 3000 MHz. A variety of radio frequency sources and apparatuses are described herein. However, other radio frequency sources and apparatuses operating within the frequency range from 1 MHz to 3 GHz may be used according to the principles and teaching of the present invention.

Radio frequency heating provides a potentially very efficient method of directly heating the water within the chambers in the filter press. This may be achieved by choosing a radio frequency for which the water has strong absorption of the radio frequency energy and fabricating the filter press out of materials with weak radio frequency absorption at the chosen frequency. Direct heating of the water also has the advantage of removing the need for indirect heating. (Indirect heating of the filter cake by passing steam through the filter plates can result in thermal problems for plastic filter plates such as softening.) For example, for water desalination, there are frequencies for which water is strongly absorbing and for which plastics materials/polymers, out of which filter plates may be made, is weakly absorbing. More details of radio frequency heating integrated with a filter press are provided in U.S. Pat. No. 8,535,542, filed Nov. 2, 2009, entitled Filter-Press with Integrated Radio Frequency Heating to Daniel J. Simpson et al., incorporated by reference in its entirety herein.

FIG. 1 shows a schematic of a water desalination system including a filter press, according to some embodiments of the present invention. The filter press 10 may be a filter press such as those manufactured and installed worldwide by DES, Inc., DryVac Canada, Ltd. and affiliated companies. FIG. 1 shows a filter press 10 for processing brine to produce a condensate and salts 24. The brine is delivered to the chambers of the filter press 10 by a pump 20. The beads 22 are delivered to the chambers from a storage vessel 31 through a hose using suction. The suction can conveniently be generated by a vacuum source 40. On completion of desalination, salts 24 and beads 22 are released from the filter press as indicated by the large arrows. The salts 24 are separated from the beads on a vibrating screen separator 30, or other suitable separating device. The vibrating screen separator may also be effective in removing salts that have accumulated on the surfaces of the beads. Furthermore, ultrasound may be used to assist in removing salts from the surfaces of the beads. The salts 24 are collected in a tray, on a conveyor belt below the separator 30, or in any other removal device. The beads 22 are removed from the vibrating screen separator 30 for reuse in the chambers of the filter press 10, and are stored in the vessel 31. In this example, brine is described as being fed into the filter press for desalination, however, a wide range of liquids, including brine, sea water, salt water contaminated oil, etc., may be desalinated using this system. The filter press system includes: vacuum source 40 connected to a knock out pot/condenser 42 and then to the filter press 10; and a boiler 50 for generating steam connected in a closed circuit to the filter press 10 and a condensate return pump 52—the direction of flow for the steam into the filter press and the condensate out of the filter press is indicated by the arrows. The vacuum source 40 is used to apply a vacuum to the chambers in the filter press to remove water vapor. The vacuum pump also reduces the boiling point of the liquid in the chambers. The condenser 42 condenses the water vapor. The boiler 50 produces steam, at approximately 15 psi, for heating the filter press 10. The steam may inflate envelopes in the filter plates in the filter press, as described in more detail below, for improving the thermal contact between the filter plates and the chambers.

Figure 2:
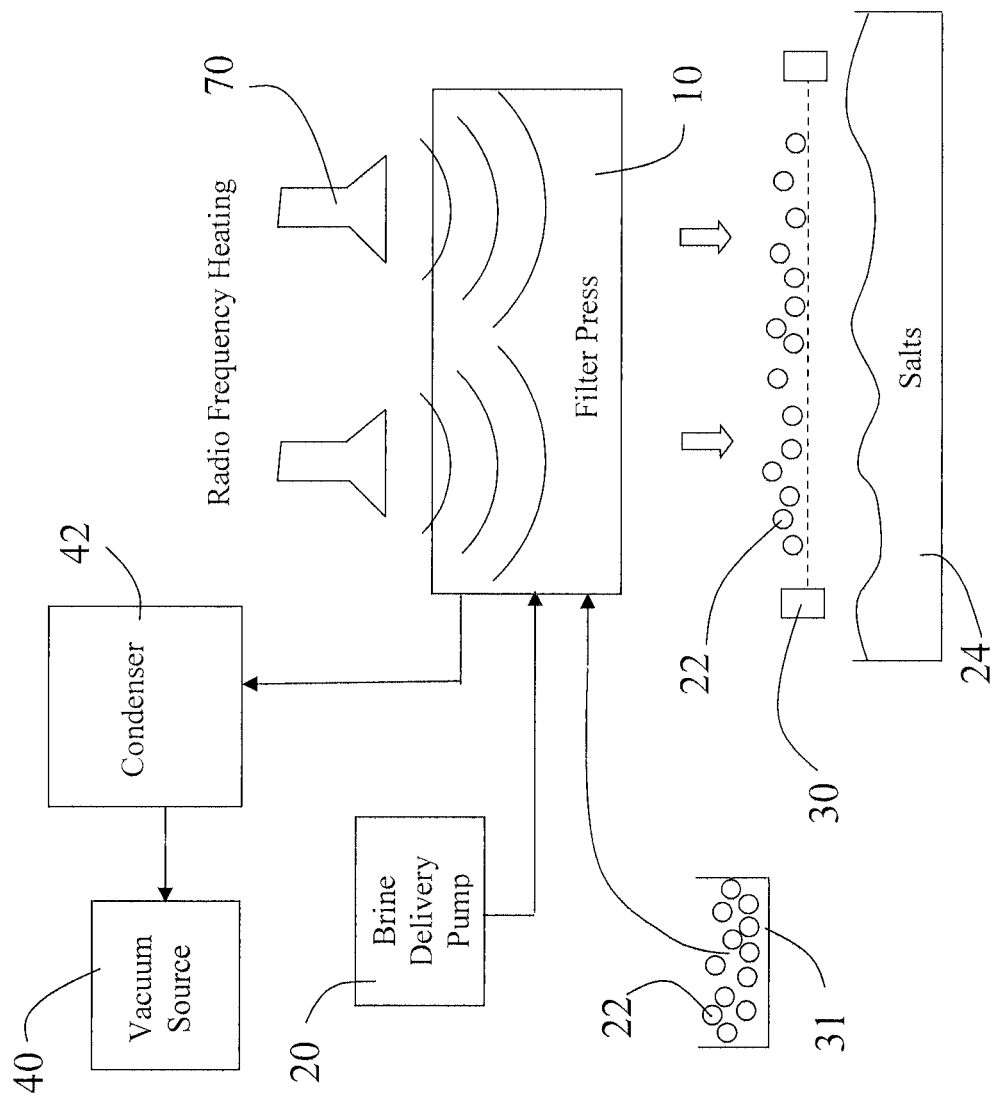
FIG. 2 is a schematic of a filter press system for water desalination including radio frequency heating, according to aspects of the present invention.

FIG. 2 shows a schematic of a filter press system including radio frequency heating, according to some embodiments of the present invention. FIG. 2 shows an example of a system for radio frequency heating—radio frequency sources 70, such as microwave sources, generate radio waves shown propagating into the filter press 10 where the water in the chambers of the filter press absorbs some of the radio frequency energy and heats up. Other than the radio frequency heating, the system of FIG. 2 operates very similarly to the system of FIG. 1. Comparing FIGS. 1 & 2, it is seen that in FIG. 2 the steam supply has been removed. Heating using radio frequency may be more efficient than using steam, and therefore removes the need for steam. However, steam may be used in combination with radio frequency heating, if desired.

As is well known in the art, filter presses include a stack of filter plates, the filter plates are covered by filter cloths, and each pair of filter plates defines a chamber lined with filter cloths into which slurry or other material is fed for dewatering or similar processing. Generally, there will be a stack of N filter plates in a filter press, and M chambers between the plates, where M=N−1 and M and N are integers. Details of filter plates which are representative of those manufactured and installed worldwide by DES, Inc., DryVac Canada, Ltd. and affiliated companies are provided below and in FIGS. 5-9. Filter plates are also described in U.S. Pat. Nos. 5,672,272 and 6,149,806 to William Baer, incorporated by reference in their entirety herein.

Figure 3A:
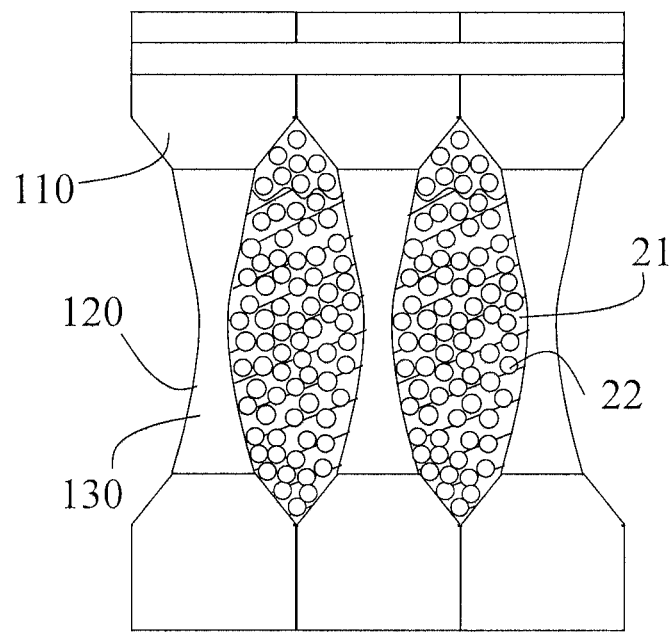
FIGS. 3A-3C are a representation of a process for water desalination using a filter press, according to some embodiments of the present invention.
Figure 3B:
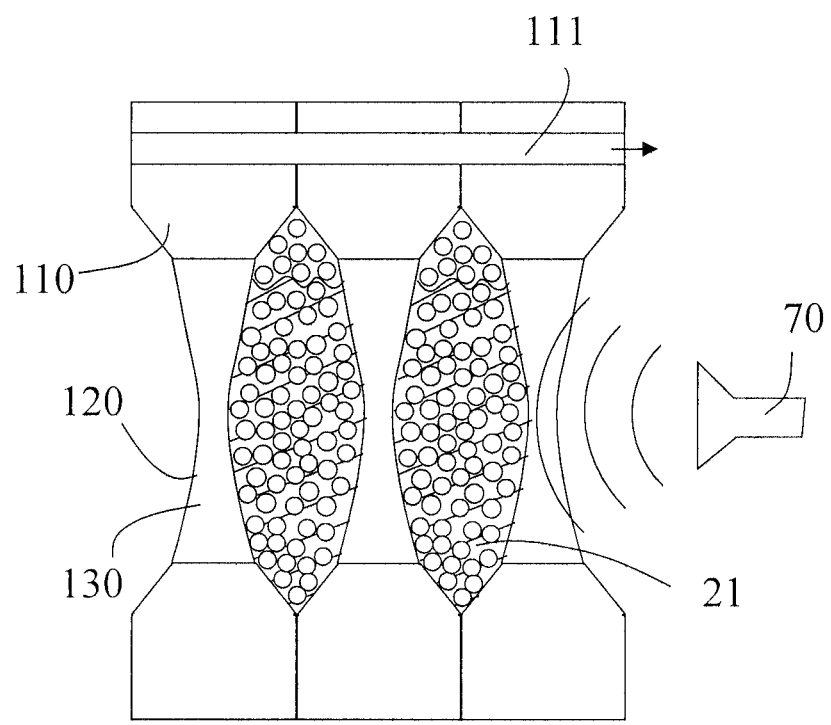
Figure 3C:
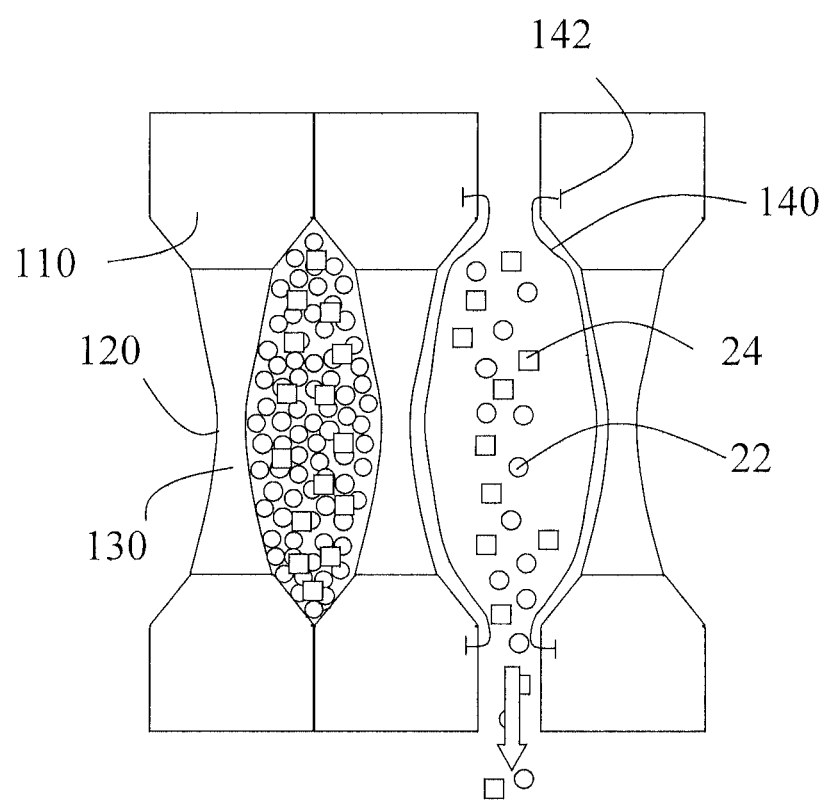
Figure 4:
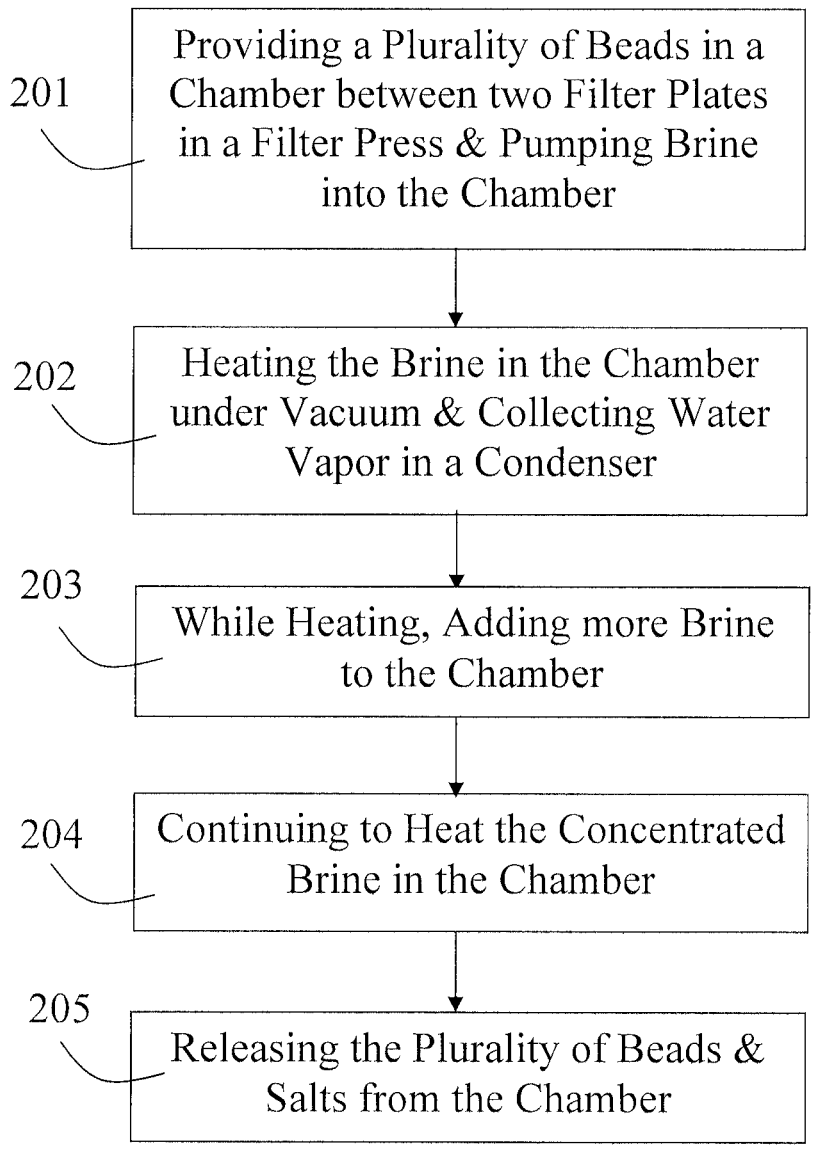
FIG. 4 is a process flow for water desalination using a filter press, according to some embodiments of the present invention.

The schematic illustrations of FIGS. 3A-3C and the process flow of FIG. 4 are used together to describe a method of water desalination using a filter press system, such as the filter press systems shown in FIGS. 1 and 2, according to some embodiments of the present invention. The illustrations in FIGS. 3A-3C show a cross-sectional view of a block of three adjacent filter plates in the filter press for four different process steps. Each of the filter plates is shown to comprise a frame 110 around the periphery of the plate, a diaphragm 120 in the center of the plate, the diaphragm containing a hollow envelope 130 which can be inflated in order to improve thermal contact between the filter plates and the chambers. Each of the chambers is lined with filter cloths 140, which are kept in position by retaining strips 142. See the right hand chamber in FIG. 3C for an illustration of the filter cloths; for ease of illustration of other features, the filter cloths have not been shown in the other chambers of FIGS. 3A-3C. Note that the filter cloths used for water desalination may be chosen from a wide range of cloth types from coarse weave cloth to membrane cloth, depending on the type of contaminants in the water.

Step 201 includes providing a plurality of beads in the chambers of a filter press and pumping brine into the bead-filled chambers. The beads fill the chambers, defining the shape and size of the chambers. The chambers are not filled to the top with brine—a space is left at the top of the chambers providing a space for steam to be collected. This is shown in FIG. 3A—chambers are shown filled with beads 22 and brine 21, with room left at the top of the chamber. Step 202 includes heating the brine in the chambers under vacuum and collecting water vapor in the condenser. The heating may be done by passing steam through the envelopes 130 or by radio frequency heating, for example. When steam heating is used, the steam may inflate the envelopes 130 to improve thermal contact between the filter plates and the chambers. FIG. 3B shows heating of the brine by radio frequency sources 70. Water vapor is produced during heating, passes through the filter cloths lining the chambers and is removed from the filter press along ducts 111 which run through the stack of filter plates, in the direction indicated by the arrow. To assist in removing the water vapor from the chambers, the chambers may have a vacuum applied to them through duct 111. The water vapor is condensed, in condenser 42, for example, as shown in FIGS. 1 & 2. Step 203 includes adding more brine to the chamber to replace the water lost as vapor, while continuing to heat the contents of the chamber and produce water vapor. As before, when more brine is added, space is left at the top of the chambers. This addition of more brine is continued until the chambers contain a significant amount of residual salts, such that there will be a need to empty the chambers to remove the salts. Step 204 includes continuing to heat the wet filter cake 23 in the chambers and continued removal of water vapor. The wet filter cake 23 is the wet salts which remain as water vapor is removed from the chambers, also referred to as concentrated brine in FIG. 4. Step 205 includes opening the filter press and releasing the contents of the chambers—dried filter cake 24 (salts) and beads 22. At this point in the process the heating has been stopped and the vacuum is no longer applied to the filter cake. As shown in FIG. 3C, the filter plates are separated to allow the dried filter cake 24 and beads 22 to fall out of the chambers, as shown, and to be collected.

Figure 5:
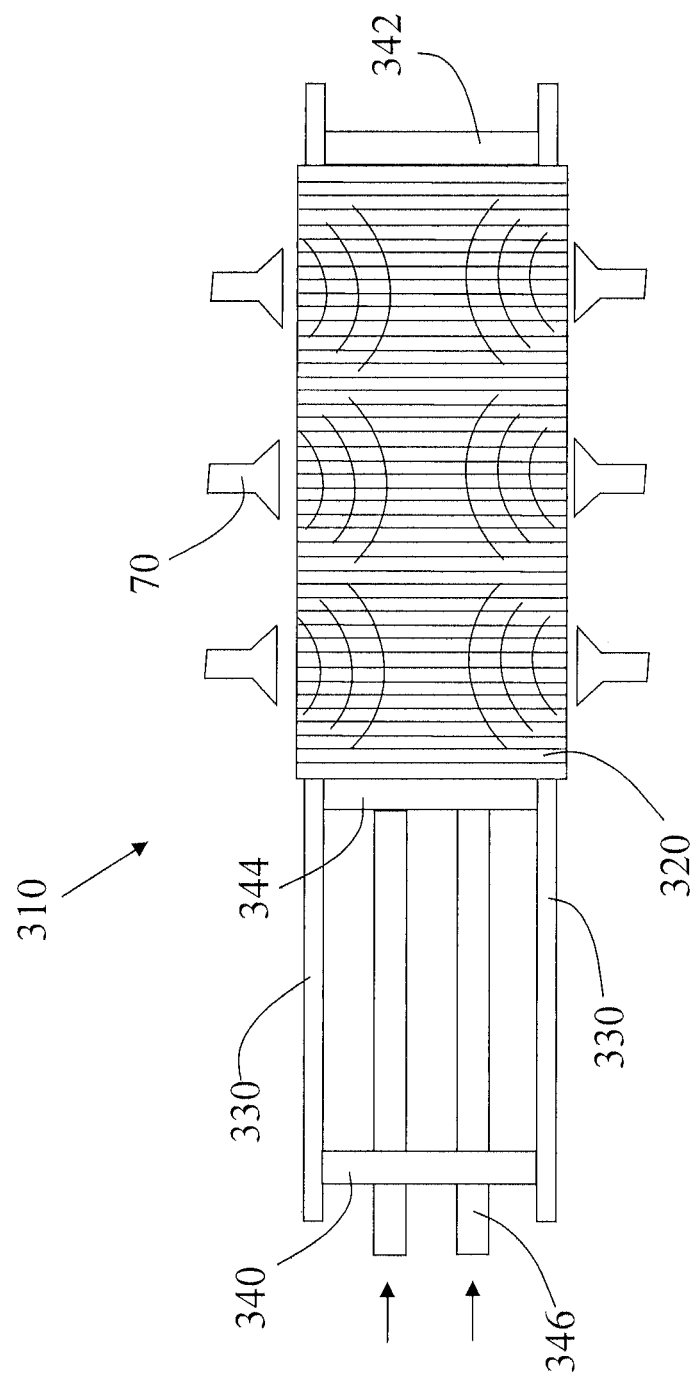
FIG. 5 is a top view representation of a filter press with integrated microwave heating using microwave horns, according to some embodiments of the present invention.

Heating of the brine/seawater in the filter press may be by radio frequency heating. U.S. Pat. No. 8,535,542, filed Nov. 2, 2009, entitled Filter-Press with Integrated Radio Frequency Heating to Daniel J. Simpson et al., incorporated by reference in its entirety herein, provides more details of radio frequency heating integrated into filter presses. FIGS. 5-7 show some examples of filter presses with radio frequency heating which may be used for water desalination.

FIG. 5 shows a top view of a filter press 310 with integrated microwave heating using microwave horns 70, according to some embodiments of the present invention. The filter press 310 includes a stack of filter plates 320 mounted in a press comprising frame rails 330, on which the filter plates hang, fixed end plates 340 and 342, a movable plate 344, and rods 346 for applying a compressive force to the movable plate 344 as shown. Application of a compressive force to the movable plate 344 results in compressing the stack of filter plates 320. The microwave horns 70 are shown propagating radio waves into the filter press where the water in the chambers absorbs the radio frequency energy and heats up. The microwave horns are arranged around the outside of the stack of filter plates so as to provide relatively uniform heating of the water within the filter press. Six microwave horns 70 are shown in the figure, but more or less may be used and arranged differently to achieve uniform heating of the filter cake in the chambers.

Further combinations of microwave antennas/sources such as those shown in FIG. 5 are also envisaged. Furthermore, microwave sources are not limited to those disclosed above, but may include microwave antennas such as monopoles, dipoles, wave guides, linear structures, helical structures, etc.

Figure 6B:
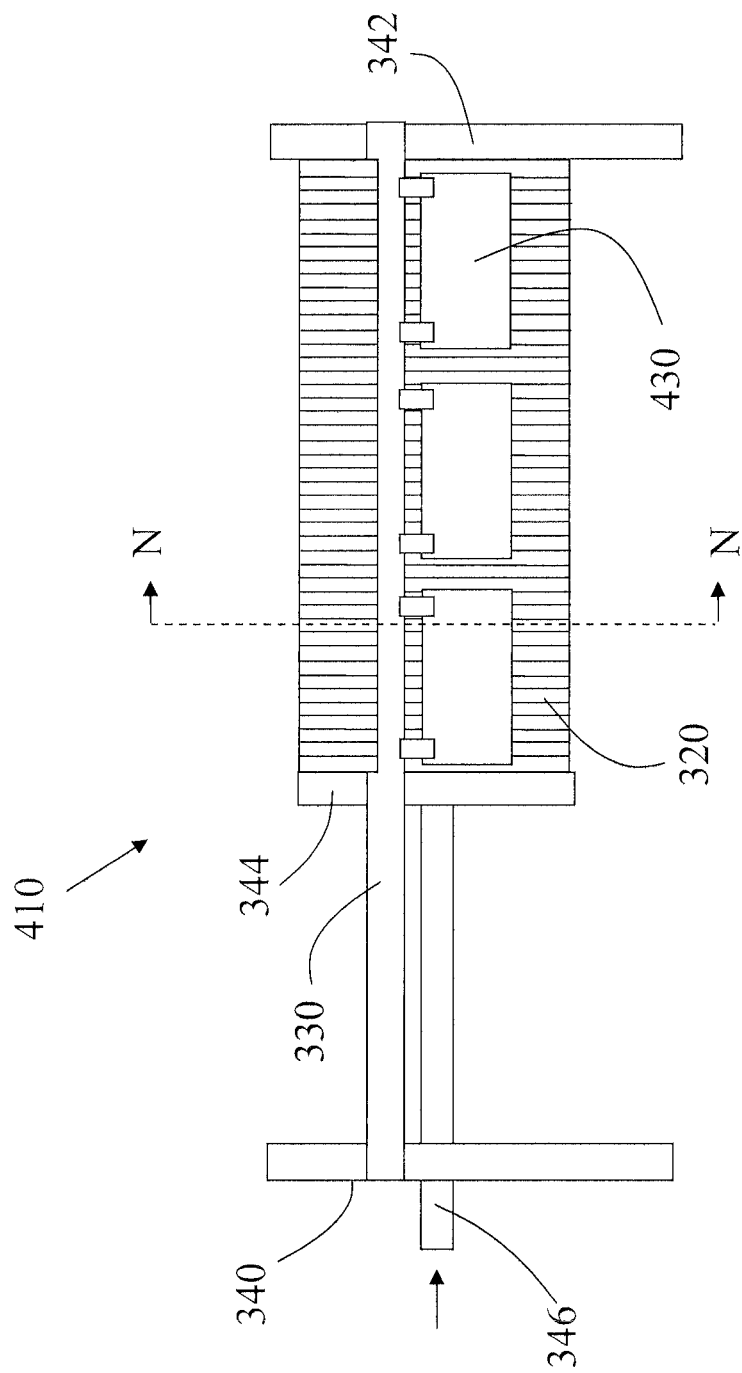
FIG. 6B shows a side view of the filter press of FIG. 6A.
Figure 7:
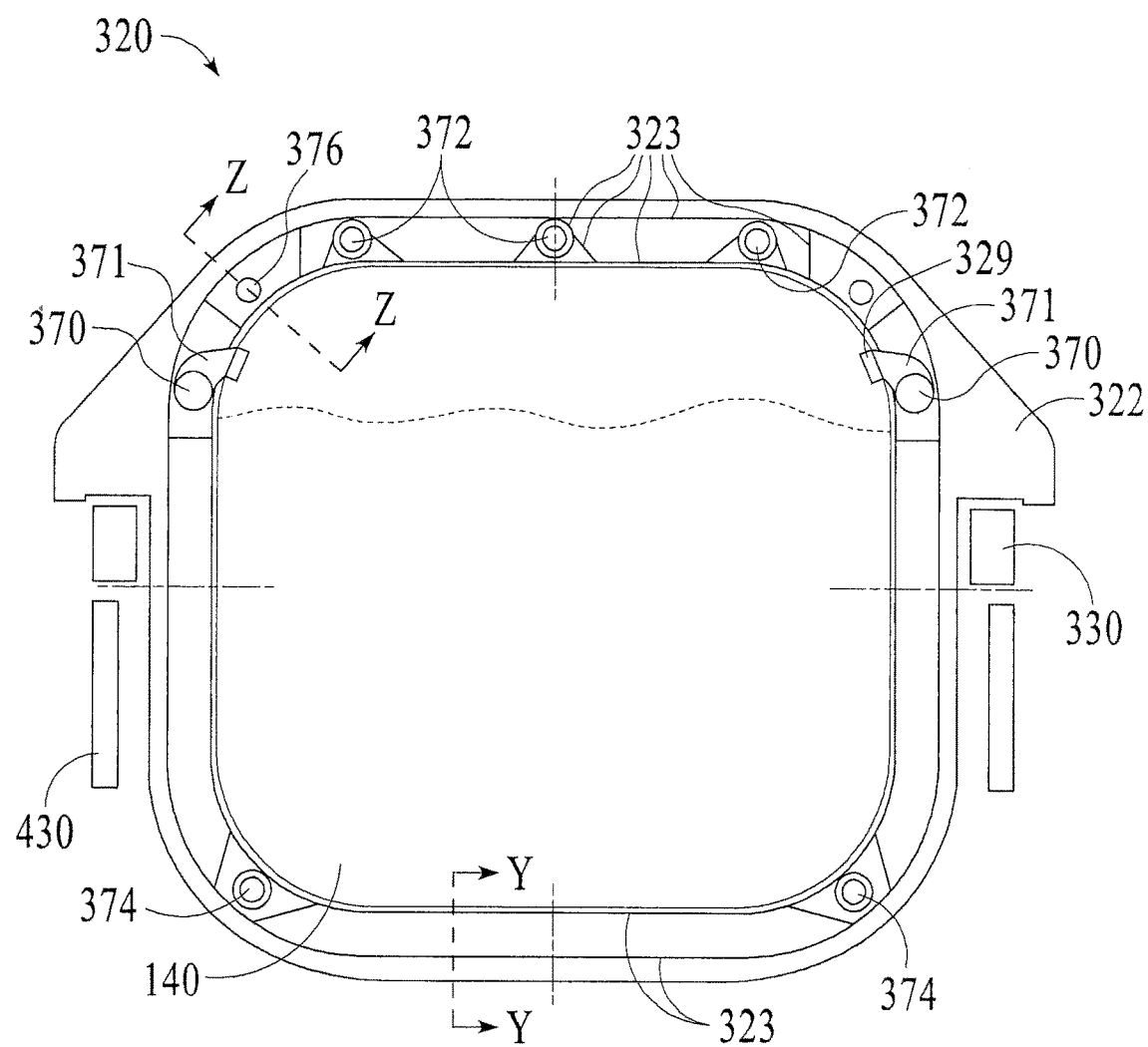
FIG. 7 is a cross section of the filter press shown in FIGS. 6A & 6B, showing the position of the parallel plate electrodes, according to some embodiments of the present invention.

FIGS. 6A & 6B show top and side views of a filter press 410 with integrated radio frequency heating using parallel plate electrodes 430, according to some embodiments of the present invention. The filter press 410 includes a stack of filter plates 320 and pairs of parallel plate electrodes 430 positioned outside the stack. In FIG. 6A, the position of the electrodes 430 is indicated by the arrows—the electrodes 430 are actually positioned under the frame rails 330, which is more clearly shown in FIG. 7. Each pair of electrodes 430 may be connected to its own radio frequency generator or a single radio frequency generator may be used for multiple pairs. The number of pairs of electrodes may be varied depending on factors such as the size of the filter press, materials limitations for the electrodes, load limitations of radio frequency generators, etc. Furthermore, in some embodiments it is envisaged that a single pair of plates 430 may be sufficient for a filter press. The placement of the electrodes 430 is determined by the desire to provide uniform heating of the water within the chambers in the filter press, and also by the desire to avoid arcing between the electrodes 430 and any parts of the filter press. The electrodes 430 may conveniently be attached to the frame rails 330, although other means of fixing the electrodes in place are clearly available, such as providing a dedicated frame specifically for mounting the electrodes. Furthermore, the shape of the electrodes may be varied as required to improve the uniformity of energy deposition in the water in the filter press, and also as required to reduce electrical discharge—by rounding the corners of the electrodes, for example.

FIG. 7 is a section along N-N in FIGS. 6A & 6B. The frame rails 330 and electrodes 430 are shown in cross-section; however, for purposes of clear illustration of certain features, the filter plate 320 is shown in plan view. The configuration of the frame rails 330 and electrodes 430 relative to the filter plate 320 is clearly shown. FIG. 7 also shows the handles 322 which are used to place the filter plate 320 on frame rails 330 and may also be used to move the plates along the frame rails. Filter cloth 140 is shown attached to the filter plate 320. An example of the fill level of the chamber between adjacent filter plates is indicated by the dotted line. Compare with FIGS. 3A & 3B which also show the fill level.

FIG. 7 also shows the various ports which are situated around the periphery of the filter plate 320. These ports are apertures which extend completely through the filter plate and connect with the corresponding ports on the neighboring filter plates in the stack. The water for desalination, such as sea water/brine, is delivered through feed ports 370. The example shown in FIG. 7 is referred to as a side feed port. The configuration of the feed ports may be changed to provide top delivery, if desired. Delivery slots 371 are machined into the filter plate to allow the mixture to get from the feed port into the filter cloth lined chamber formed between adjacent filter plates. Steam ports 372 are for delivering steam into the envelope in the middle of the filter plate, and condensate ports 374 are for draining condensate from the envelope. (The envelope 130/360 is shown in FIGS. 3A-3C and 8.) Alternatively, ports 372 and 374 may be used for inflating/deflating the envelope using compressed air—when steam is not being used. Ports 376 are used to remove the water vapor and may be connected to a vacuum pump and condenser. See FIGS. 1-2.

Figure 8:
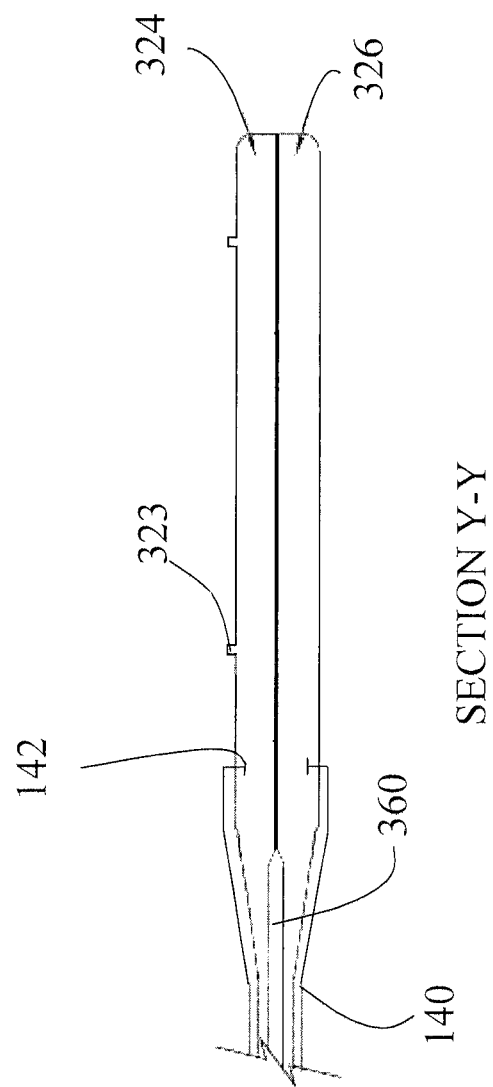
FIG. 8 is a cross-section of the filter plate of FIG. 7 showing detail of the sealing flanges, according to some embodiments of the present invention.

FIGS. 7 and 8 show compression rings/flanges 323 that are used to form a seal between adjacent filter plates. FIG. 8 is a cross-section along Y-Y in FIG. 7. Each of the filter plates has a flange on a first side (upper part 324) and a flat surface on the second side (lower part 326). The flange has a rectangular cross-section, as shown. When the flange of a first plate is brought into contact with the flat surface of an adjacent second plate and pressure is applied, a seal is formed between the first and second plates. The flanges 323 are also seen to provide isolation for the different ports around the periphery of the filter plate, thus ensuring that vacuum ports are isolated from feed ports, for example.

FIG. 7 also shows the position of the filter cloth 140 in the central area of the filter plate 320. Note that a clamp 329 is used to fix the edge of the filter cloth at the bottom of delivery slot 371, which ensures that the mixture is directed into the filter cloth lined chamber formed between adjacent filter plates. Furthermore, FIG. 8 shows filter cloths 140 on both sides of the filter plate (the filter plate comprising upper part 324 and lower part 326). The filter cloths are held in place by retaining straps 142, which are discussed in more detail below with reference to FIG. 9.

Figure 9:
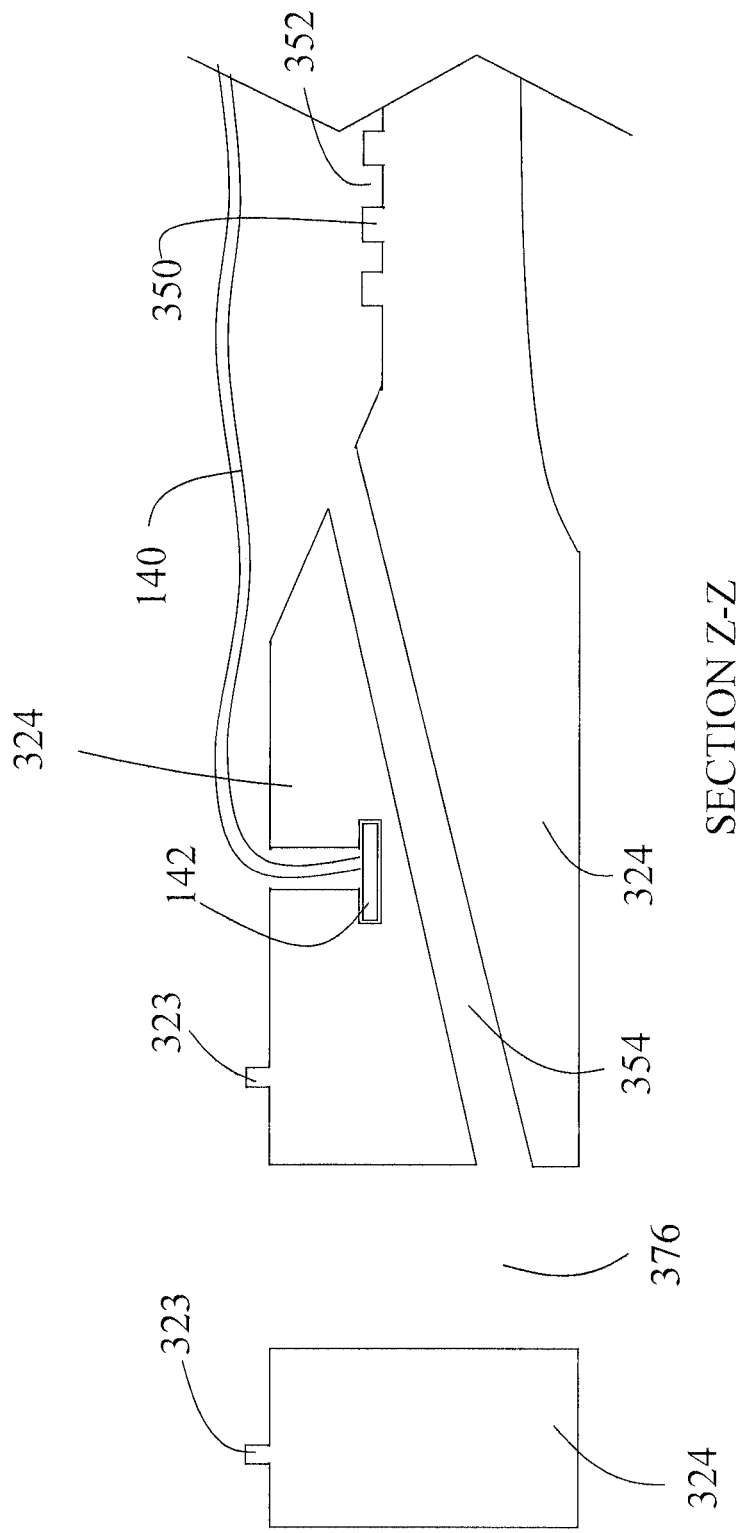
FIG. 9 is a cross section of the filter plate of FIG. 7, showing drainage holes and the retention of the filter cloth, according to some embodiments of the present invention.

FIG. 9 shows a cross-sectional representation of the upper part 324 of filter plate 320 along Z-Z in FIG. 7. The section is through a vacuum port 376 and shows how the port 376 communicates with the chamber in between filter plates through machined hole 354. Hole 354 may have a circular cross-section in a plane orthogonal to the plane of the section. Hole 354 allows water vapor to be vacuumed out of the chamber. Although not shown, those skilled in the art will appreciate, after reading the present disclosure, that a similar configuration may exist at the ports 372 and 374 for allowing steam to inflate the envelope 360. (See FIGS. 7 & 8.)

The beads and brine are in the chamber in between filter plates, where the chamber is lined with filter cloths 140. (See FIGS. 3A-3C.) The section in FIG. 9 shows the filter cloth 140 at the edge of the chamber and shows how the cloth may be kept in position using a vinyl strap 142 seated in a "T" shaped slot machined in the filter plate. The vinyl strap 142 may be stitched into the edge of the filter cloth 140. The section also shows features 350 with channels 352 between on the surface of the diaphragm part of the filter plate. (See also FIGS. 3A-3C.) The channels are arranged so as to allow any water vapor which is squeezed or vacuumed through the filter cloth 140 to pass to hole 354 and to vacuum port 376. The filter plate is similarly configured at each vacuum port 376. (See FIG. 7 for position of ports.) Note that for some applications of the filter press for desalination, the surface of the diaphragm can be smooth, rather than waffled; a smooth surface may provide better thermal contact between the filter plate and the chamber.

The frame rails and other structural components of the filter press may be formed of carbon fiber and other non-metallic materials, as required to use radio frequency heating. The stack of filter plates may be surrounded by a radio frequency screening material, so as to reduce radio frequency radiation outside of the filter press, if needed.

Dewatering using the present invention is capable of producing dried filter cake (salts) containing less than 10% water by weight, and even less than 1% water by weight.

In general, microwave frequencies may be well suited for small filter presses and the lower frequencies may be well suited for large filter presses. This is due to the lower frequencies being more penetrating within the filter press. The use of radio frequency has a further advantage in that it is effective in destroying biological growths, pathogens and viruses.

Although the present invention has been described with reference to water desalination, the teaching and principles of the present invention are applicable to a wide variety of fluid purification processes. For example, the teaching of the present invention is applicable to purification of salt water contaminated oil—for removal of both water and salts—and also to purification of biodiesel fuels. Note that when processing flammable substances in the filter press, heating using steam is preferred for safety reasons over RF/microwave heating.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A filter press system for water desalination, said filter press system comprising:
a frame;
a plurality of filter plates configured to form a stack of parallel plates, each of said plurality of filter plates being movably attached to said frame, said plurality of filter plates further being configured to form a multiplicity of chambers, each of said multiplicity of chambers being formed by adjacent filter plates of said plurality of filter plates, each of said multiplicity of chambers being lined by filter cloths and substantially filled with beads, wherein said plurality of filter plates, said multiplicity of chambers and said filter cloths are configured to allow water vapor to escape from said chambers while retaining salts from said water to form a filter cake;
a radio frequency heater, for heating said water in said multiplicity of chambers;
a condenser for condensing said water vapor; and
a separator for separating said beads from said filter cake after said filter cake is released from said chambers;
wherein said radio frequency heater comprises parallel electrode plates electrically coupled to a radio frequency generator, said parallel electrode plates being configured (1) with the planes of said parallel electrode plates roughly orthogonally to the planes of each of said plurality of filter plates, (2) in close proximity to the outer surface of said plurality of filter plates, and (3) on either side of said plurality of filter plates.

2. The system as in claim 1, further comprising a vacuum pump connected to said multiplicity of chambers.

3. The system as in claim 1, wherein said radio frequency heater generates radiation at a frequency between 1 and 100 MHz.

4. The system as in claim 1, further comprising a boiler, said boiler being connected to said plurality of filter plates by conduits for delivering steam to cavities within said plurality of filter plates.

5. The system as in claim 1, wherein said separator is a vibrating screen separator.

6. The system as in claim 1, wherein said plurality of filter plates is N filter plates and said multiplicity of chambers is M chambers, M is equal to N−1, and N and M are integers.

7. The system as in claim 1, wherein said beads are plastic beads.

8. The system as in claim 1, wherein said beads are metal beads.

9. The system as in claim 1, wherein said beads have spherical surfaces.

10. The system as in claim 1, wherein said beads have diameters of approximately 3 millimeters.

11. The system as in claim 1, wherein said frame comprises frame rails, said plurality of filter plates being movably attached to said frame rails, said frame rails consisting of non-metallic material.

12. The system as in claim 11, wherein said frame rails comprise carbon fiber.

13. The system as in claim 11, wherein said electrode plates are attached to said frame rails.

14. A filter press system for water desalination, said filter press system comprising:
a frame;
a plurality of filter plates configured to form a stack of parallel plates, each of said plurality of filter plates being movably attached to said frame, said plurality of filter plates further being configured to form a multiplicity of chambers, each of said multiplicity of chambers being formed by adjacent filter plates of said plurality of filter plates, each of said multiplicity of chambers being lined by filter cloths and substantially filled with beads, wherein said plurality of filter plates, said multiplicity of chambers and said filter cloths are configured to allow water vapor to escape from said chambers while retaining salts from said water to form a filter cake;
a radio frequency heater, for heating said water in said multiplicity of chambers;
a condenser for condensing said water vapor; and
a separator for separating said beads from said filter cake after said filter cake is released from said chambers;
wherein said radio frequency heater comprises multiple microwave horns positioned on the surface of said plurality of filter plates and configured to direct microwave radiation into said chambers.

15. The system as in claim 14, further comprising a vacuum pump connected to said multiplicity of chambers.

16. The system as in claim 14, wherein said radio frequency heater generates radiation at a frequency between 300 and 3000 MHz.

17. The system as in claim 14, further comprising a boiler, said boiler being connected to said plurality of filter plates by conduits for delivering steam to cavities within said plurality of filter plates.

18. The system as in claim 14, wherein said separator is a vibrating screen separator.

19. The system as in claim 14, wherein said plurality of filter plates is N filter plates and said multiplicity of chambers is M chambers, M is equal to N−1, and N and M are integers.

20. The system as in claim 14, wherein said beads are plastic beads.

21. The system as in claim 14, wherein said beads are metal beads.

22. The system as in claim 14, wherein said beads have spherical surfaces.

23. The system as in claim 14, wherein said beads have diameters of approximately 3 millimeters.

24. The system as in claim 14, wherein said frame comprises frame rails, said plurality of filter plates being movably attached to said frame rails, said frame rails consisting of non-metallic material.

25. The system as in claim 24, wherein said frame rails comprise carbon fiber.

* * * * *